United States Patent
Ho et al.

(10) Patent No.: US 11,900,978 B1
(45) Date of Patent: Feb. 13, 2024

(54) MAGNETIC RECORDING MEDIUM WITH UNDERLAYER CONFIGURED TO REDUCE DIFFUSION OF TITANIUM INTO A MAGNETIC RECORDING LAYER

(71) Applicant: Western Digital Technologies, Inc., San Jose, CA (US)

(72) Inventors: Hoan Cong Ho, San Jose, CA (US); Hua Yuan, San Ramon, CA (US); Tomoko Seki, Sunnyvale, CA (US); Paul Christopher Dorsey, Los Altos, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/886,244

(22) Filed: Aug. 11, 2022

(51) Int. Cl.
*G11B 5/73* (2006.01)
*G11B 5/00* (2006.01)

(52) U.S. Cl.
CPC .. *G11B 5/73917* (2019.05); *G11B 2005/0021* (2013.01)

(58) Field of Classification Search
None
See application file for complete search history.

(56) References Cited

U.S. PATENT DOCUMENTS

| | | | |
|---|---|---|---|
| 6,579,590 B2 | 6/2003 | Ju et al. | |
| 7,869,162 B2 | 1/2011 | Lu et al. | |
| 8,941,950 B2 | 1/2015 | Yuan et al. | |
| 8,993,134 B2 | 3/2015 | Varaprasad et al. | |
| 9,076,476 B2 | 7/2015 | Kryder et al. | |
| 9,177,585 B1 | 11/2015 | Seki et al. | |
| 9,368,142 B2* | 6/2016 | Chen | G11B 5/657 |
| 9,530,445 B1 | 12/2016 | Grobis et al. | |

(Continued)

FOREIGN PATENT DOCUMENTS

| JP | 6185591 B2 | 8/2017 |
|---|---|---|
| JP | 2020164959 A | 10/2020 |

OTHER PUBLICATIONS

Sepehri-Amin, H. et al., "Microstructure and magnetic properties of FePt—(C,SiO2) granular films deposited on MgO, MgTiO, and MgTiON underlayers", Scripta Materialia; vol. 157; Dec. 2018; https://doi.org/10.1016/j.scriptamat.2018.07.025; 5 pages.

(Continued)

*Primary Examiner* — Kevin M Bernatz
(74) *Attorney, Agent, or Firm* — LOZA & LOZA, LLP; Gabriel Fitch

(57) ABSTRACT

Various apparatuses, systems, methods, and media are disclosed to provide a heat-assisted magnetic recording (HAMR) medium that has a magnetic recording layer on a magnesium oxide-titanium oxide (MTO) underlayer, where the MTO underlayer includes an additive material that chemically bonds with titanium. In some examples, the additive material includes iron-oxide, iron, carbon, or various aluminum oxides. By providing the additive material to the MTO that chemically bonds with the titanium of the MTO, diffusion of titanium from the MTO underlayer into the magnetic recording layer is mitigated to provide an improved recording layer that achieves improved areal densities. In some embodiments, an additional magnesium oxide-nitrogen underlayer is also provided, which may include more of the additive material.

24 Claims, 9 Drawing Sheets

(56) References Cited

U.S. PATENT DOCUMENTS

| | | | |
|---|---|---|---|
| 9,672,854 B2 | 6/2017 | Kubota et al. | |
| 9,754,618 B1 | 9/2017 | Srinivasan et al. | |
| 9,822,441 B2 | 11/2017 | Liu et al. | |
| 10,127,939 B2 | 11/2018 | Niwa et al. | |
| 10,255,939 B2 | 4/2019 | Hu et al. | |
| 10,276,201 B1 | 4/2019 | Srinivasan et al. | |
| 10,347,281 B2* | 7/2019 | Arora | G11B 5/746 |
| 10,439,133 B2 | 10/2019 | Apalkov et al. | |
| 10,453,487 B2 | 10/2019 | Kubota et al. | |
| 10,650,854 B1* | 5/2020 | Yuan | G11B 5/012 |
| 10,923,150 B2 | 2/2021 | Moriya et al. | |
| 11,521,648 B2* | 12/2022 | Ho | G11B 5/7369 |
| 11,521,658 B2* | 12/2022 | Choi | G11C 11/223 |
| 2007/0148500 A1 | 6/2007 | Maeda et al. | |
| 2013/0314815 A1* | 11/2013 | Yuan | G11B 5/7369 360/59 |
| 2014/0072828 A1 | 3/2014 | Inaba et al. | |
| 2014/0099517 A1 | 4/2014 | Hu et al. | |
| 2014/0335376 A1 | 11/2014 | Valaprasad et al. | |
| 2014/0376127 A1 | 12/2014 | Kanbe et al. | |
| 2015/0017480 A1 | 1/2015 | Hirotsune et al. | |
| 2015/0093598 A1* | 4/2015 | Kubota | G11B 5/7375 204/192.15 |
| 2016/0099016 A1 | 4/2016 | Kubota et al. | |
| 2018/0040346 A1 | 2/2018 | Moriya et al. | |
| 2018/0218752 A1 | 8/2018 | Lu et al. | |
| 2018/0286441 A1 | 10/2018 | Lu | |
| 2023/0005503 A1 | 1/2023 | Iwanami et al. | |
| 2023/0178106 A1 | 6/2023 | Zavaliche et al. | |

OTHER PUBLICATIONS

Hung, Shih-Hsuan et al., "First-principles prediction of the morphology of L10 FePt nanoparticles supported on Mg(Ti)O for heat-assisted magnetic recording applications", Physical Review Materials; Jul. 12, 2017; https://journals.aps.org/prmaterials/pdf/10.1103/PhysRevMaterials.1.024405; 6 pages.

Deng, J. Y. et al., "Effect of TiON—MgO intermediate layer on microstructure and magnetic properties of L10 FePt—C—SiO2 films", Journal of Magnetism and Magnetic Materials; vol. 417; Nov. 1, 2016; https://doi.org/10.1016/j.jmmm.2016.05.096; 13 pages.

Tsai, Jai-Lin et al., "Switching Field Distribution in BN/FePlCAg/MgTiON and FePtCAg/MgTiOBN Films", Nanomaterials; Mar. 6, 2022; https://doi.org/10.3390/nano12050874; 13 pages.

Hung, Shih-Hsuan, "Shaping Nanostructure Using Molecules", University of New York; Department of Physics; Dec. 2018; https://etheses.whiterose.ac.uk/23493/1/Shih-Hsuan-Hung-Final-Thesis.pdf; 159 pages.

Ho, Hoan, "Control of Microstructure, Texture and Magnetic Properties of L10FePt Granular Magnetic Recording Media", Carnegie Mellon University; ProQuest Dissertations Publishing; Apr. 2014; https://www.proquest.com/openview/69daf59548ac85e58164e3a80ae83bcb/1?pq-origsite=gscholar&cbl=18750; 24 pages.

Samad, Mohammed Abdul et al., "A Novel Approach of Carbon Embedding in Magnetic Media for Future Head/Disk Interface", IEEE Transactions on Magnetics; vol. 48, Issue 5; May 2012; https://ieeexplore.ieee.org/document/6187782; 6 pages.

Shiroyama, T. et al., "Influence of MgO underlayers on the structure and magnetic properties of FePt—C nanogranular films for heat-assisted magnetic recording media"; AIP Advances; Oct. 2016; https://doi.org/10.1063/1.4964930; 11 pages.

Pandey, H. et al., "Structure Optimization of FePt—C Nanogranular films for Heat Assisted Magnetic Recording Media"; IEEE Transactions on Magnetics; vol. 52, Issue 2; Feb. 2016; https://ieeexplore.ieee.org/document/7247737; 8 pages.

Xu, Baoxi et al., "HAMR Media Design in Optical and Thermal Aspects"; IEEE Transactions on Magnetics; vol. 49, Issue 6; Jun. 2013; https://ieeexplore.ieee.org/document/6522295; 6 pages.

Choi, Jina et al., "Effects of Single Metal-Ion Doping on the Visible-Light Photoreactivity of TiO2"; American Chemical Society; 2010; https://pubs.acs.org/doi/10.1021/jp908088x; 10 pages.

International Search Report and Written Opinion for International Application No. PCT/US22/27235, dated Aug. 11, 2022, 10 pages.

Hono, Kazuhiro, "FePt Nanogranular films for high density heat-assisted magnetic recording", Microelectronics & Nanoelectronics; 2022 Merck KGaA; Darmstadt, Germany; accessed Feb. 5, 2022; https://www.sigmaaldrich.com/US/en/technical-documents/technical-article/materials-science-and-engineering/microelectronics-and-nanoelectronics/fept-nanogranular-films; 4 pages.

Zhou, Bing et al., "The utilization of boron nitride (BN) for granular L10-FePt HAMR media fabrication", Applied Physics Letters; vol. 118, Issue 16; Apr. 21, 2021; https://doi.org/10.1063/5.0045901; 6 pages.

Tsai, Jai-Lin et al., "Influence of an MgTiTaON Inserted Layer on Magnetic Properties and Microstructure of FePtAgC Films", Coatings; Apr. 8, 2019; https://doi.org/10.3390/coatings9040238; 11 pages.

Hu, J. F. et al., "HAMR Medium Structure Design and its Process for Excellent Thermal Performance", IEEE Transactions on Magnetics; vol. 50, Issue 3; Mar. 2014; https://ieeexplore.ieee.org/document/6774999; 6 pages.

Jubert, Pierre-Olivier et al., "Optimizing the Optical and Thermal Design of Heat-Assisted Magnetic Recording Media", IEEE Transactions on Magnetics; vol. 53, Issue 2; Feb. 2017; https://ieeexplore.ieee.org/document/7556254; 9 pages.

* cited by examiner

MAGNETIC RECORDING MEDIUM WITH UNDERLAYER CONFIGURED TO REDUCE DIFFUSION OF TITANIUM INTO A MAGNETIC RECORDING LAYER

FIELD

The disclosure relates, in some aspects, to magnetic recording media. More specifically, but not exclusively, the disclosure relates to magnetic recording media configured for use with heat-assisted magnetic recording (HAMR).

INTRODUCTION

Magnetic storage systems, such as a hard disk drive (HDD), are utilized in a wide variety of devices in stationary and mobile computing environments. Examples of devices that incorporate magnetic storage systems include desktop computers, portable notebook computers, portable hard disk drives, high-definition television (HDTV) receivers, television set top boxes, video game consoles, and portable media players.

A typical disk drive includes magnetic storage media in the form of one or more flat disks. The disks are generally formed of few main substances, namely, a substrate material that gives it structure and rigidity, a magnetic recording layer that holds the magnetic impulses or moments that store digital data, and media overcoat and lubricant layers to protect the magnetic recording layer. The typical disk drive also includes a read head and a write head, generally in the form of a magnetic transducer which can sense and/or change the magnetic fields stored on the recording layer of the disks.

Heat Assisted Magnetic Recording (HAMR) systems can increase the areal density of information recorded magnetically on various magnetic media. To achieve higher areal density for magnetic storage, smaller magnetic grain sizes (e.g., less than 6 nanometers (nm)) may be required. In HAMR, high temperatures are applied to the media during writing to facilitate recording to small grains. The high temperatures may be achieved using a near field transducer that is coupled to a laser diode of a slider of a HAMR disk drive.

At least some magnetic recording media for use with HAMR employ a magnesium-titanium oxide (MTO) layer beneath the magnetic recording layer or layers. Issues can arise involving the diffusion of titanium from the MTO layer into the magnetic recording layer(s). Aspects of the present disclosure are directed to addressing diffusion issues within magnetic recording media for use with HAMR or other magnetic recording media.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

In one embodiment, a magnetic recording medium is provided that includes: a substrate; a heatsink layer on the substrate; an underlayer comprising MgOTiO (MTO) on the heatsink layer, wherein the underlayer further includes an additive material configured to chemically bond with titanium; and a magnetic recording layer on the underlayer. In some aspects, the recording medium is configured for use with Energy/Heat Assisted Magnetic Recording (HAMR). In some aspects, the additive material includes at least one of FeO, Fe, C, or $Al_2O_3$. In some aspects, the additive material in the MTO underlayer is configured to reduce an amount of diffusion of the titanium into the magnetic recording layer relative to an amount of diffusion occurring without the additive material. In some aspects, the MTO underlayer includes: $(100-a)[(100-b)MgO-bTiO]-aX$, wherein X is the additive material, wherein a is in the range of 0.1 to 10 mol %, inclusive, and wherein b is in the range of 40 to 100 mol %, inclusive. In some aspects, the recording medium also includes an MgO—$N_2$ layer between the MTO underlayer and the magnetic recording layer. In some aspects, the MgO—$N_2$ layer further includes at least one of FeO, Fe, C, or $Al_2O_3$. In some aspects, the recording medium also includes an adhesion layer, a soft underlayer (SUL), and a seed layer, in that order, between the substrate and the heatsink layer, and a thermal resistive layer between the heatsink layer and the MTO underlayer. In some aspects, a capping layer is provided on the magnetic recording layer and a carbon overcoat (COC) is provided on the capping layer.

In another embodiment, a method for manufacturing a recording medium is provided. The method includes: providing a substrate; providing a heatsink layer on the substrate; providing an underlayer comprising MTO on the heatsink layer, wherein the underlayer further includes an additive material configured to chemically bond with titanium. In some aspects, the additive material includes at least one of FeO, Fe, C, or $Al_2O_3$. In some aspects, an amount of the additive material in the MTO underlayer is selected to reduce an amount of diffusion of the titanium into the magnetic recording layer relative to an amount of diffusion occurring without the additive material. In some aspects, the MTO underlayer includes: $(100-a)[(100-b)MgO-bTiO]-aX$, wherein X is the additive material, wherein a is in the range of 0.1 to 10 mol %, inclusive, and wherein b is in the range of 40 to 100 mol %, inclusive. In some aspects, the method also includes providing an MgO—$N_2$ layer between the MTO underlayer and the magnetic recording layer. In some aspects, the MgO—$N_2$ layer further includes at least one of FeO, Fe, C, or $Al_2O_3$. In some aspects, the method also includes providing an adhesion layer, an SUL, and a seed layer, in that order, between the substrate and the heatsink layer, and providing a thermal resistive layer between the heatsink layer and the MTO underlayer. In some aspects, the method includes providing a capping layer on the magnetic recording layer and a COC on the capping layer.

In yet another embodiment, a medium configured for HAMR is provided that includes: a substrate; a heatsink layer on the substrate; an underlayer comprising MgOTiO (MTO) on the heatsink layer; and a magnetic recording layer on the underlayer; wherein the underlayer further comprises an additive material that reduces an amount of diffusion of titanium from the underlayer into the magnetic recording layer to no more than two nanometers. For example, in some aspects, the MTO of the underlayer includes: $(100-a)[(100-b)MgO-bTiO]-aX$, wherein a is in the range of 0.1 to 10 mol %, inclusive, and wherein b is in the range of 40 to 100 mol %, inclusive. In some aspects, the additive material X includes at least one of FeO, Fe, C, or $Al_2O_3$.

These and other aspects of the disclosure will become more fully understood upon a review of the detailed description, which follows. Other aspects, features, and implementations of the disclosure will become apparent to those of ordinary skill in the art, upon reviewing the following description of specific implementations of the disclosure in conjunction with the accompanying figures. While features of the disclosure may be discussed relative to certain implementations and figures below, all implementations of the disclosure can include one or more of the advantageous features discussed herein. In other words, while one or more implementations may be discussed as having certain advantageous features, one or more of such features may also be used in accordance with the various implementations of the disclosure discussed herein. In similar fashion, while certain implementations may be discussed below as device, system, or method implementations, it should be understood that such implementations can be implemented in various devices, systems, and methods.

BRIEF DESCRIPTION OF THE DRAWINGS

A more particular description is included below with reference to specific aspects illustrated in the appended drawings. Understanding that these drawings depict only certain aspects of the disclosure and are not therefore to be considered to be limiting of its scope, the disclosure is described and explained with additional specificity and detail through the use of the accompanying drawings, in which.

DETAILED DESCRIPTION

Figure 1:
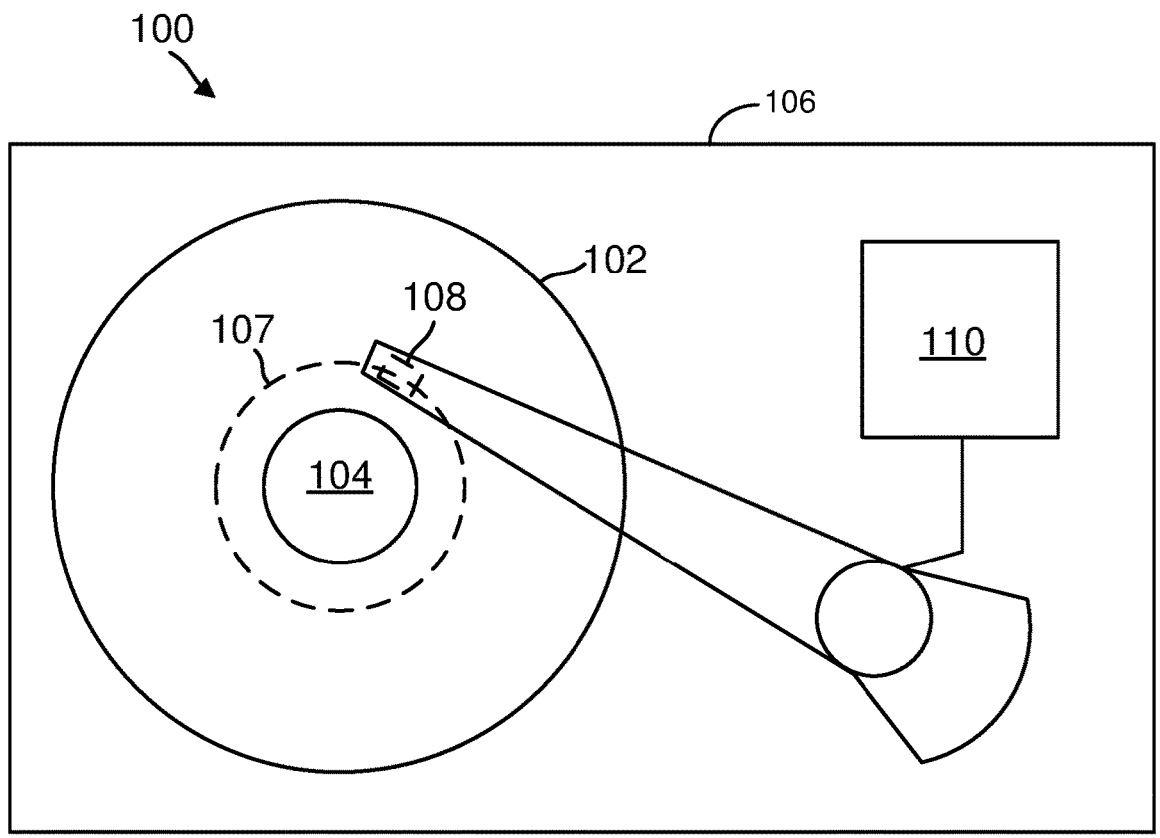
FIG. 1 is a top schematic view of an exemplary disk drive configured for heat-assisted magnetic recording (HAMR) including a slider and a HAMR medium having a magnesium oxide-titanium oxide (MTO) underlayer that includes an additive material, such as FeO, that chemically bonds with the titanium in the MTO to reduce diffusion of titanium into a magnetic recording layer, in accordance with an aspect of the disclosure.

In the following detailed description, reference is made to the accompanying drawings, which form a part thereof. In addition to the illustrative aspects, aspects, and features described above, further aspects, aspects, and features will become apparent by reference to the drawings and the following detailed description. The description of elements in each figure may refer to elements of proceeding figures. Like numbers may refer to like elements in the figures, including alternate aspects of like elements.

The disclosure relates in some aspects to various apparatuses, systems, methods, and media for providing a magnetic recording medium such as a Heat-Assisted Magnetic Recording (HAMR) medium that can, among other features, reduce the diffusion of titanium from a magnesium titanium oxide (MTO) layer into a magnetic recording layer. For example, diffusion can be a significant issue if the magnetic recording layer is formed of iron (Fe)-platinum (Pt) because the titanium (Ti) and the Fe can form intermetallic compounds in the process temperature range (e.g., at HAMR temperatures). HAMR is a type of Energy-Assisted Magnetic Recording (EAMR), which is a broader term that covers HAMR as well as Microwave Assisted Magnetic Recording (MAMR). At least some aspects of the present disclosure are not limited to HAMR and are applicable to EAMR. Note also that the MTO layer is referred to herein as an "underlayer," but the MTO layer might be referred to by other names as well, such as an "interlayer layer," a "seed layer," or the like.

In at least some HAMR media, the MTO layer includes magnesium oxide (MgO) and titanium oxide (TiO). At least some of the titanium from the TiO of the MTO layer can diffuse into an adjacent magnetic recording layer (e.g., an Fe—Pt recording layer), which can degrade the recording layer and, e.g., reduce the overall areal density that can be achieved. To address this problem, at least some HAMR media include MTO-$N_2$, where N is bonded with Ti. However, the MTO layers sputtered with $N_2$ gas can cause a significantly higher level or amount of defects. In other cases, some HAMR media include an MgO—$N_2$ layer between the MTO layer and the recording layer. The MgO—$N_2$ layer serves as a barrier to prevent (or reduce) diffusion of the TiO from the MTO layer into the FePt magnetic recording layer. (Note that the MTO layer and the MgO—$N_2$ layer may be collectively referred to as a "bilayer" or a "dual layer" underlayer.) Although the use of the additional MgO layer can mitigate diffusion of titanium from the MTO layer into the magnetic recording layer, MgO has a low radio-frequency (RF) sputtering rate and is susceptible to particle spitting (which results in a higher amount of defects formed on media disks) and corrosion, and hence is not ideal.

Herein, to address these and other issues, a magnetic recording medium is provided that includes: a substrate; a heatsink layer on the substrate, an underlayer on the heatsink layer, wherein the underlayer includes MTO and an additive material that chemically bonds with titanium; and a magnetic recording layer on the underlayer. In some examples, the additive material includes FeO, Fe, C, and/or $Al_2O_3$. In some aspects, the MTO layer is: (100–a)[(100–b)MgO-bTiO]-aX, wherein X is the additive material, wherein a is in the range of 0.1 to 10 mol %, inclusive, and wherein b is in the range of 40 to 100 mol %, inclusive. (Herein, mole percentage, mol %, is defined as the percentage that the moles of a particular component are to the total moles that are in the compound.) In one particular example, a is 5% and the additive material (X) is FeO and so, in that example, the MTO layer includes 5% FeO (e.g., 95MTO-5FeO). By providing the additive material that chemically bonds or binds with the titanium in the MTO underlayer, diffusion of titanium from the MTO underlayer into the magnetic recording layer is mitigated to provide an improved recording layer (e.g., the FePt layer) that can achieve improved areal densities. In some embodiments, the additional MgO layer (described above) is not used. However, in other embodiments, the additional MgO layer is nevertheless provided, which also includes some amount of the additive material. That is, in some examples, the additive material is provided within both the MTO underlayer and in the additional MgO layer so as to further reduce diffusion of titanium into the FePt magnetic recording layer. In still other examples, the additional MgO layer is provided but without the additive material.

Illustrative Examples and Embodiments

FIG. 1 is a top schematic view of a data storage device 100 (e.g., disk drive or magnetic recording device) configured for magnetic recording and comprising a slider 108 and a magnetic recording medium 102 that includes an MTO layer beneath a magnetic recording layer, where the MTO layer includes an additive material that chemically bonds with titanium, such as FeO, Fe, C, and/or $Al_2O_3$. In illustrative examples, the magnetic recording medium 102 includes a HAMR medium. The laser (not visible in FIG. 1 but see 114 in FIG. 2) is positioned with a magnetic head/slider 108. Disk drive 100 may comprise one or more disks/media 102 to store data. Disk/media 102 resides on a spindle assembly 104 that is mounted to a drive housing 106. Data may be stored along tracks in the magnetic recording layer of disk 102. The reading and writing of data is accomplished with the head 108 (slider) that may have both read and write elements (108a and 108b). The write element 108a is used to alter the properties of the magnetic recording layer of disk 102 and thereby write information thereto. In one aspect, head 108 may have magneto-resistive (MR) based elements, such as tunnel magneto-resistive (TMR) elements for reading, and a write pole with coils that can be energized for writing. In operation, a spindle motor (not shown) rotates the spindle assembly 104, and thereby rotates the disk 102 to position the head 108 at a particular location along a desired disk track 107. The position of the head 108 relative to the disk 102 may be controlled by the control circuitry 110 (e.g., a microcontroller). It is noted that while an exemplary HAMR system is shown, at least some aspects of the disclosure may be used in other HAMR or EAMR magnetic data recording systems or in non-HAMR or non-EAMR magnetic data recording systems, including single-written magnetic recording (SMR) media, perpendicular magnetic recording (PMR) media, or microwave assisted magnetic recording (MAMR) media.

Figure 2:
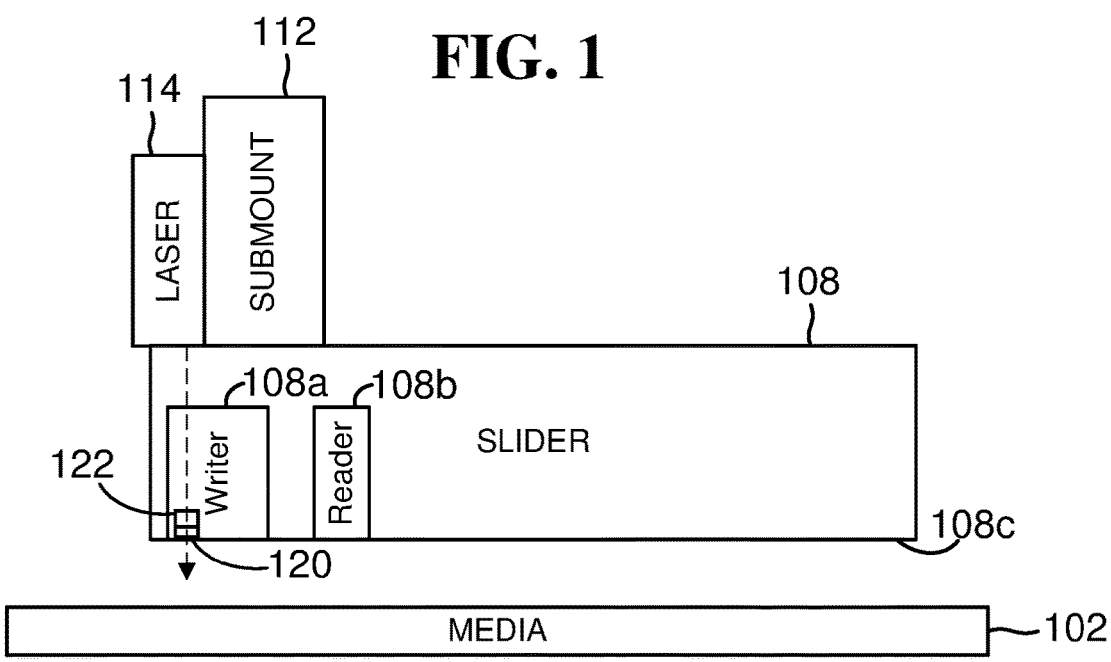
FIG. 2 is a side schematic view of the exemplary slider and HAMR medium of FIG. 1 in accordance with an aspect of the disclosure.

FIG. 2 is a side schematic view of the slider 108 and magnetic recording medium 102 of FIG. 1. The magnetic recording medium 102 that includes the MTO layer beneath the magnetic recording layer, where the MTO layer includes an additive material that chemically bonds with titanium, such as FeO, Fe, C, and/or $Al_2O_3$. The slider 108 may comprise a sub-mount 112 attached to a top surface of the slider 108. The laser 114 may be attached to the sub-mount 112, and possibly to the slider 108. The slider 108 comprises a write element (e.g., writer) 108a and a read element (e.g., reader) 108b positioned along an air bearing surface (ABS) 108c of the slider for writing information to, and reading information from, respectively, the media 102. In other aspects, the slider may also comprise a layer of Si or Si cladding 120. This layer is optional.

In operation, the laser 114 is configured to generate and direct light energy to a waveguide (e.g., along the dashed line) in the slider which directs the light to a near field transducer (NFT) 122 near the air bearing surface (e.g., bottom surface) 108c of the slider 108. Upon receiving the light from the laser 114 via the waveguide, the NFT 122 generates localized heat energy that heats a portion of the media 102 within or near the write element 108a, and near the read element 108b. The anticipated recording temperature is in the range of about 350° C. to 400° C. In the aspect illustrated in FIG. 2, the laser directed light is disposed within the writer 108a and near a trailing edge of the slider. In other aspects, the laser directed light may instead be positioned between the writer 108a and the reader 108b. FIGS. 1 and 2 illustrate a specific example of a HAMR system. In other examples, the magnetic recording medium 102 can be used in other suitable HAMR systems (e.g., with other sliders configured for HAMR).

Figure 3:
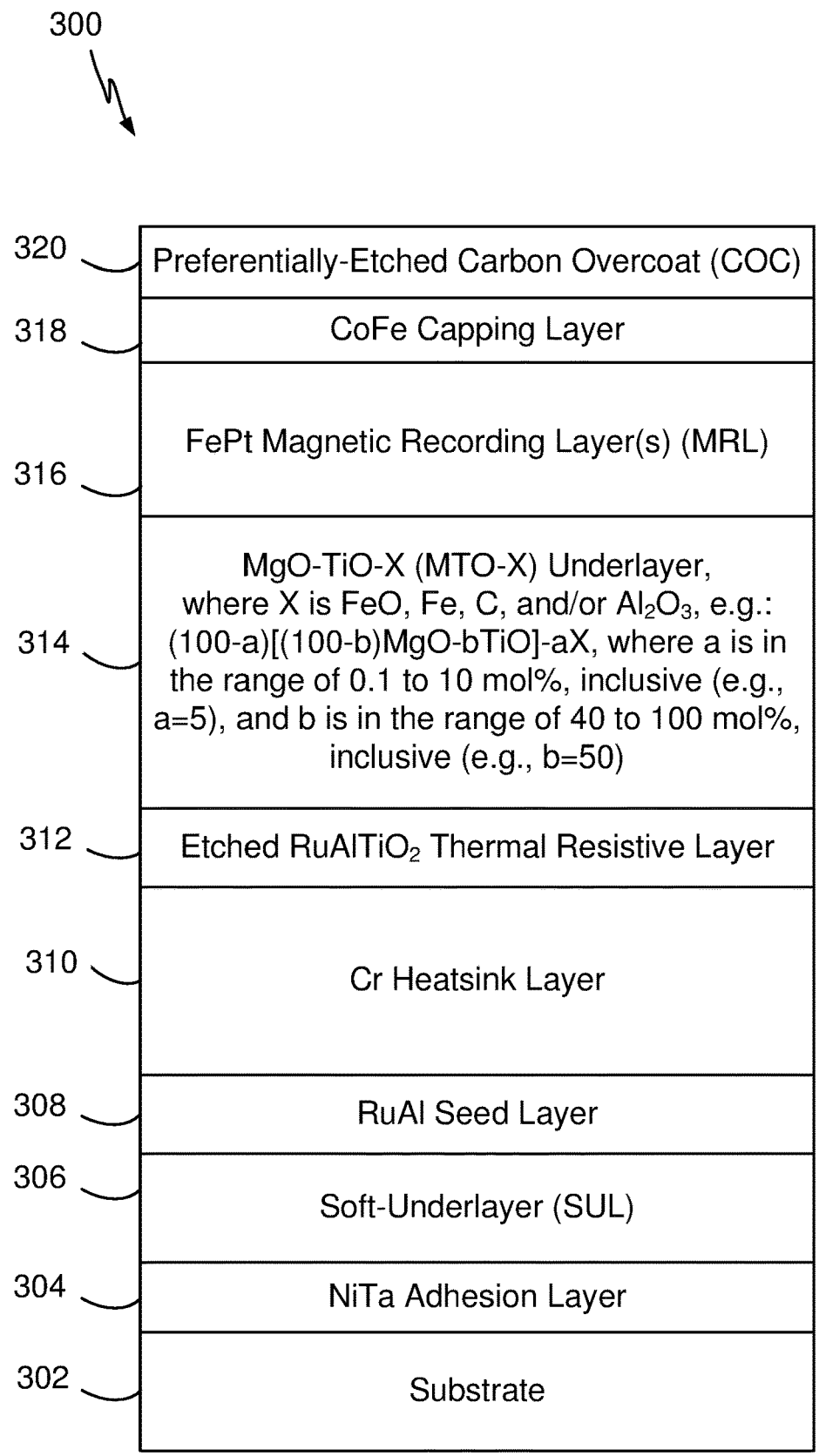
FIG. 3 is a side schematic view of an exemplary HAMR medium that includes, among other layers, an MTO underlayer that includes the additive material that chemically bonds with titanium, in accordance with an aspect of the disclosure.

FIG. 3 is a side schematic view of an exemplary HAMR medium 300 in accordance with an aspect of the disclosure. In the example of FIG. 3 the MTO layer that includes the additive material is referred to as an MgO—TiO—X (MTO-X) underlayer, where X designates the additive material that chemically bonds with titanium.

The HAMR medium 300 of FIG. 3 has a stacked structure with a substrate 302 at a bottom/base layer, an adhesion layer 304 (which may be formed, e.g., of NiTa) on the substrate 302, a soft underlayer (SUL) 306 on the adhesion layer 304, a seed layer 308 (which may be formed, e.g., of RuAl) on the SUL 306, a heatsink layer 310 (which may be formed, e.g., of Cr) on the seed layer 308, an etched thermal resistive layer 312 (which may be formed, e.g., of $RuAlTiO_2$ and etched using a New Carbon Technology system of Intevac™ to reduce roughness), an MgO—TiO—X (MTO-X) underlayer 314 (where X is an additive material that chemically bonds with titanium, such as FeO, Fe, C, and/or $Al_2O_3$) on the thermal resistive layer 312. In some examples, the MTO underlayer 314 layer is: (100–a)[(100–b)MgO-bTiO]-aX, where a is in the range of 0.1 to 10 mol %, inclusive, and b is in the range of 40 to 100 mol %, inclusive. In some aspects, when X is FeO, an "a" value of 5 is preferred (corresponding to a 5% concentration of the FeO) and a "b" value of 50 is preferred (corresponding to about equal concentrations of MgO and TiO in the MTO). In some aspects, the additive is a material selected to reduce an amount of diffusion of titanium from the underlayer into the magnetic recording layer to no more than two nanometers (nm) into the magnetic recording layer or some other predetermined distance value in the range of 1.5 nm to 2.5 nm or the narrower range of 1.75 nm to 2.25 nm. In this regard, some analyses have indicated that Ti diffuses up to 3 nm into a magnetic layer in a media where the underlayer is just MTO, whereas Ti diffuses only up to 2 nm into the magnetic layer in the media where the underlayer is MTO-5% FeO. In some aspects, the additive material is a material that has an inhibiting effect on diffusion of Ti from the underlayer into the magnetic recording layer. In some aspects, the additive material is a material that reduces the amount of Ti in magnetic recording layer to below a predetermined threshold concentration.

A magnetic recording layer (MRL) 316 (which may be formed, e.g., of FePt) is on the MTO underlayer 314. A capping layer 318 (which may be formed, e.g., of CoFe) is on the MRL 316. A preferentially etched carbon overcoat layer (COC) 320 is on the capping layer 318. The preferentially etched COC includes an etching step prior to carbon deposition to reduce media surface roughness. Although not shown, an additional lubricant layer may be on the COC layer 320. Note that the layers in the figure (or in other figures herein) are not shown to scale.

The terms "above," "below," "on," and "between" as used herein refer to a relative position of one layer with respect to other layers. As such, one layer deposited or disposed on, above, or below another layer may be directly in contact with the other layer or may have one or more intervening layers. Moreover, one layer deposited or disposed between layers may be directly in contact with the layers or may have one or more intervening layers.

In some aspects, the layers have the following thicknesses: the substrate 302 thickness is in the range of 0.5 mm to 0.635 mm; the adhesion layer 304 thickness is in the range of 45 nm to 180 nm; the SUL 306 thickness is in the range of 85 nm to 130 nm; the seed layer 308 thickness is in the range of 2 nm to 34 nm; the heatsink layer 310 thickness is in the range of 55 nm to 100 nm; the etched thermal resistive layer 312 thickness is in the range of 0.5 nm to 2.0 nm; the MTO-X underlayer 314 thickness is in the range of 1 to 4 nm (with a thickness of 2.5 nm preferred in some examples); the MRL 316 thickness is in the range of 8 nm to 11 nm; the capping layer 318 thickness is in the range of 1 nm to 3 nm; the preferentially etched COC 320 thickness is in the range of 32 Å to 40 Å; the lubricant layer thickness (if provided) is in the range of 7 Å to 9.5 Å. Otherwise routine experimentation can be used to determine suitable or preferred layer thicknesses and/or suitable or preferred compound percentage concentrations for use within practical HAMR systems based on the particular characteristics of the system, such as its operating temperature, the desired areal density of data, etc.

In some examples, the substrate 302 has an outer diameter (i.e., OD) of about 97 mm and a thickness of about 0.5 mm. In other examples, the OD may be 95 mm or 95.1 mm. (Generally speaking, such disks are all referred to as "3.5 inch" disks.) In some aspects, the substrate 302 may be made of one or more materials such as an Al alloy, NiP-plated Al, glass, glass ceramic, and/or combinations thereof.

In some aspects, the adhesion layer 304 (which might alternatively be referred to as a pre-seed layer) is used to reduce delamination of layers or films deposited over the adhesion layer. The adhesion layer 304 may be a metallic alloy, such as NiTa (as shown, or CrTi), etc.

In some aspects, the SUL 306 can be made of one or more materials, such as Co, Fe, Mo) Ta, Nb, B, Cr, or other soft magnetic materials, or combinations thereof. The SUL 306 may include an amorphous compound or combination of Co and Fe (e.g., a CoFe alloy) with the addition of one or more elements from Mo, Nb, Ta, W, and B. The SUL 306 may be configured to support magnetization of the magnetic recording layer structure 316 during data storage operations. More specifically, the SUL 306 may be configured to provide a return path for a magnetic field applied during a write operation.

In some aspects, the seed layer 308 is used to create a growth template for the subsequently-deposited films including the heatsink layer 310 and the MRL 316. Functional goals for the seed layer 308 include small grain size and good crystallographic texture, both of which may be desirable for good media recording performance.

In some aspects, the heatsink layer 310 can be made of one or more materials such as Cr, as shown, or Ag, Al, Au, Cu, Mo, Ru, W, CuZr, MoCu, AgPd, CrRu, CrV, CrW, CrMo, CrNd, NiAl, NiTa, combinations thereof, and/or other suitable materials known in the art.

In some aspects, the thermal resistive layer 312 is deposited to provide thermal resistance to the heatsink layer 310. As noted above, the thermal resistive layer 312 may be etched to reduce roughness.

In some aspects, the above-described MTO-X underlayer 314 is provided, e.g., to assist in nucleation so as to permit proper crystal growth within the MRL 316 so that the MRL 316 will have good crystallographic texture with small grains.

In some aspects, the MRL 316 includes one or more magnetic recording layers for storing data magnetically, not explicitly shown in in FIG. 3. For example, the MRL 316 may include magnetic recording sub-layers and exchange control sub-layers (ECLs). Collectively, the sub-layers form an MRL structure 316 that may be, e.g., 100-200 angstroms (Å) thick. In some aspects, the MRL 316 may be made of FePt. In some aspects, the MRL 316 may be made instead of an alloy selected from FePtY, where Y is a material selected from Cu, Ni, and combinations thereof. In other aspects, the MRL 316 may be made instead of a CoPt alloy. In some aspects, the MRL 316 may be formed of high anisotropy $L1_0$ FePt with segregants such as C, BN, $SiO_2$, Ag, and combinations thereof. In some aspects, the MRL is a four layer MRL. Each layer of the MRL may have segregants with the amount of segregant varying from layer to layer within the MRL.

In some aspects, the CoFe capping layer 318 may be made instead of just Co, Pt, or Pd. In one example, the capping layer 318 can be a bi-layer structure having a top layer including Co and a bottom layer including Pt or Pd. In addition to the Co/Pt and Co/Pd combinations of the top layer and the bottom layer, specific combinations of the top layer materials and the bottom layer materials may include, for example, Co/Au, Co/Ag, Co/Al, Co/Cu, Co/Ir, Co/Mo, Co/Ni, Co/Os, Co/Ru, Co/Ti, Co/V, Fe/Ag, Fe/Au, Fe/Cu, Fe/Mo, Fe/Pd, Ni/Au, Ni/Cu, Ni/Mo, Ni/Pd, Ni/Re, etc. In additional examples, top layer materials and bottom layer materials include any combination of Pt and Pd (e.g., alloys), or any of the following elements, alone or in combination: Au, Ag, Al, Cu, Jr, Mo, Ni, Os, Ru, Ti, V, Fe, Re, and the like.

In some aspects, if a lubricant layer is also provided on the COC 320, the lubricant layer (not shown in the figure) may be made of a polymer-based lubricant material.

Figure 4:
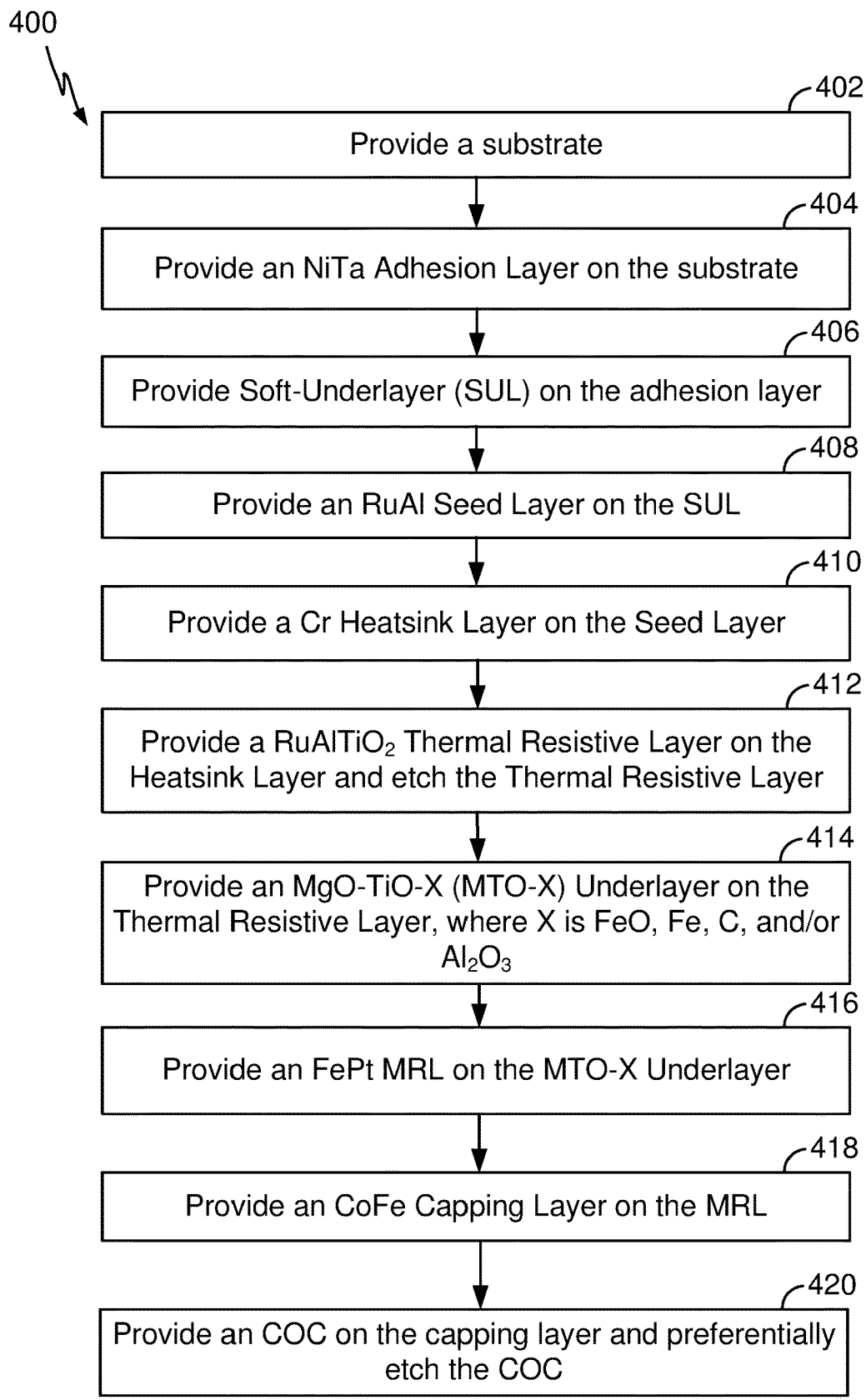
FIG. 4 is a flowchart of an exemplary process for fabricating a HAMR medium that includes an MTO underlayer having the additive material that chemically bonds with titanium, in accordance with some aspects of the disclosure.

FIG. 4 is a flowchart of a process 400 for fabricating a HAMR medium with an MTO—X layer in accordance with some aspects of the disclosure. In one aspect, the process 400 can be used to fabricate the HAMR media described above in relation to FIG. 3. In block 402, the process provides a substrate. In block 404, the process provides an adhesion layer (which may be formed, e.g., of NiTa) on the substrate. In block 406, the process provides an SUL on the adhesion layer. In block 408, the process provides a seed layer (which may be formed, e.g., of RuAl) on the SUL. In block 410, the process provides a heatsink layer (which may be formed, e.g., of Cr) on the seed layer. In block 412, the process provides a thermal resistive layer (which may be formed, e.g., of $RuAlTiO_2$) and then etches the thermal resistive layer. In block 414, the process provides an MgO—TiO—X (MTO-X) underlayer (where X is an additive material that chemically bonds with titanium, such as FeO, Fe, C, and/or $Al_2O_3$) on the thermal resistive layer. In block 416, the process provides an MRL (which may be formed, e.g., of FePt) on the MTO-X underlayer. In block 418, the process provides a capping layer 318 (which may be formed, e.g., of CoFe) on the MRL. In block 420, the process provides a COC on the capping layer and then preferentially etches the COC. Although not shown, the process may also provide a lubricant layer on the COC. Additional or alternative exemplary materials are listed above.

Thus, FIGS. 3 and 4 illustrate HAMR media and methods where the additional MgO—$N_2$ layer described above (provided to mitigate diffusion of titanium from the MTO layer into the magnetic recording layer) is omitted. Rather than providing the additional MgO—$N_2$ layer, the MTO—X layer is provided with the additive material (X) that chemically bonds with titanium to mitigate diffusion of the titanium into the magnetic recording layer. In the example where the MTO—X layer includes 5% FeO, a HAMR medium with the MTO-FeO layer (and without the additional MgO—$N_2$ layer) was found to provide similar performance compared to a HAMR medium that has an MTO layer (without FeO) and a MgO—$N_2$ layer. That is, despite the omission of the additional MgO—$N_2$ layer, the HAMR medium performs about as well, thus demonstrating that the addition of the FeO additive material mitigates the titanium diffusion into the magnetic recording layer.

In the next example (FIGS. 5. and 6), rather than omitting the additional MgO—$N_2$ layer, an MgO—$N_2$ layer is provided that also includes the additive material. By providing an MgO—$N_2$—X layer in addition to an MTO—X layer, titanium diffusion can be further mitigated.

Figure 5:
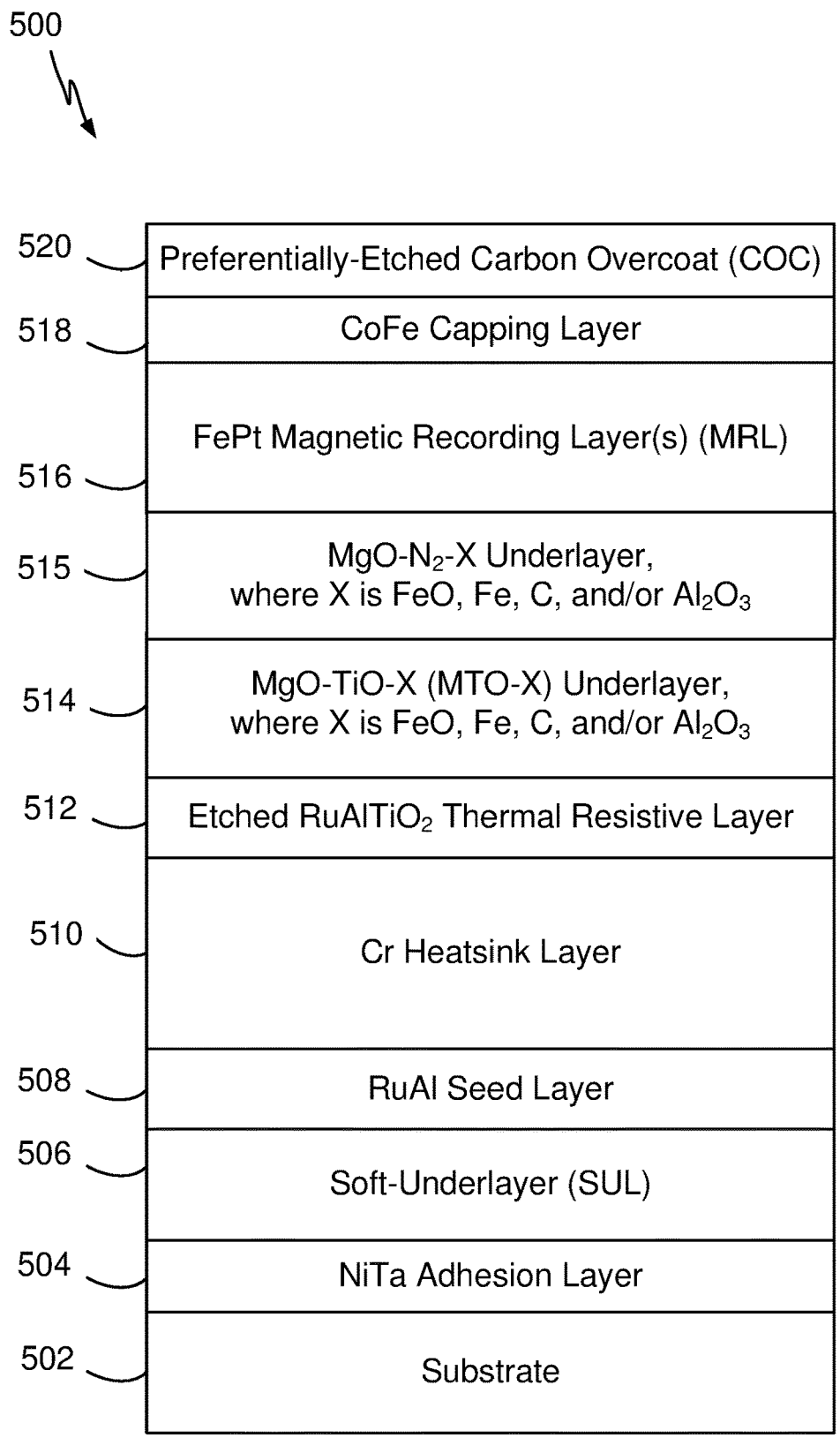
FIG. 5 is a side schematic view of an exemplary HAMR medium that includes, among other layers, an MTO underlayer and a magnesium oxide (MgO) underlayer that both include the additive material that chemically bonds with titanium, in accordance with an aspect of the disclosure.

FIG. 5 is a side schematic view of an exemplary HAMR medium 500 in accordance with an aspect of the disclosure that includes an additional underlayer between the MTO layer and the MRL. In this example, the additional underlayer is an MgO—$N_2$ layer. In the example of FIG. 5 the MTO layer and the additional MgO—$N_2$ layer both include the additive material X, where X designates an additive material that chemically bonds with titanium. Note that the particular additive material within the MTO layer may differ for the particular additive material within the MgO—$N_2$ layer, or the additive material may be the same but provided at a different concentration. As with the HAMR medium of FIG. 3, the HAMR medium 500 of FIG. 5 has a stacked structure with a substrate 502 at a bottom/base layer, an adhesion layer 504 on the substrate 502, an SUL 506 on the adhesion layer 504, a seed layer 508 on the SUL 506, a heatsink layer 510 on the seed layer 508, an etched thermal resistive layer 512, and an MgO—TiO—X (MTO-X) underlayer 514 (where X is an additive material that chemically bonds with titanium, such as FeO, Fe, C, and/or $Al_2O_3$) on the thermal resistive layer 512. In some examples, the MTO 514 underlayer is: (100−a)[(100−b)MgO-bTiO]-aX, where a is in the range of 0.1 to 10 mol %, inclusive, and b is in the range of 40 to 100 mol %, inclusive. Additionally, an MgO—$N_2$—X underlayer 515 (where X is an additive material that chemically bonds with titanium, such as FeO, Fe, C, and/or $Al_2O_3$) is provided on the MGO—X layer 515. An MRL 516 is on the MTO underlayer 514, a capping layer 518 is on the MRL 516, and a preferentially etched COC 520 is on the capping layer 518. Although not shown, an additional lubricant layer may be on the COC layer 520. The layers are again not shown to scale. See, above, for further information regarding exemplary compounds that may be used in the various layers.

Figure 6:
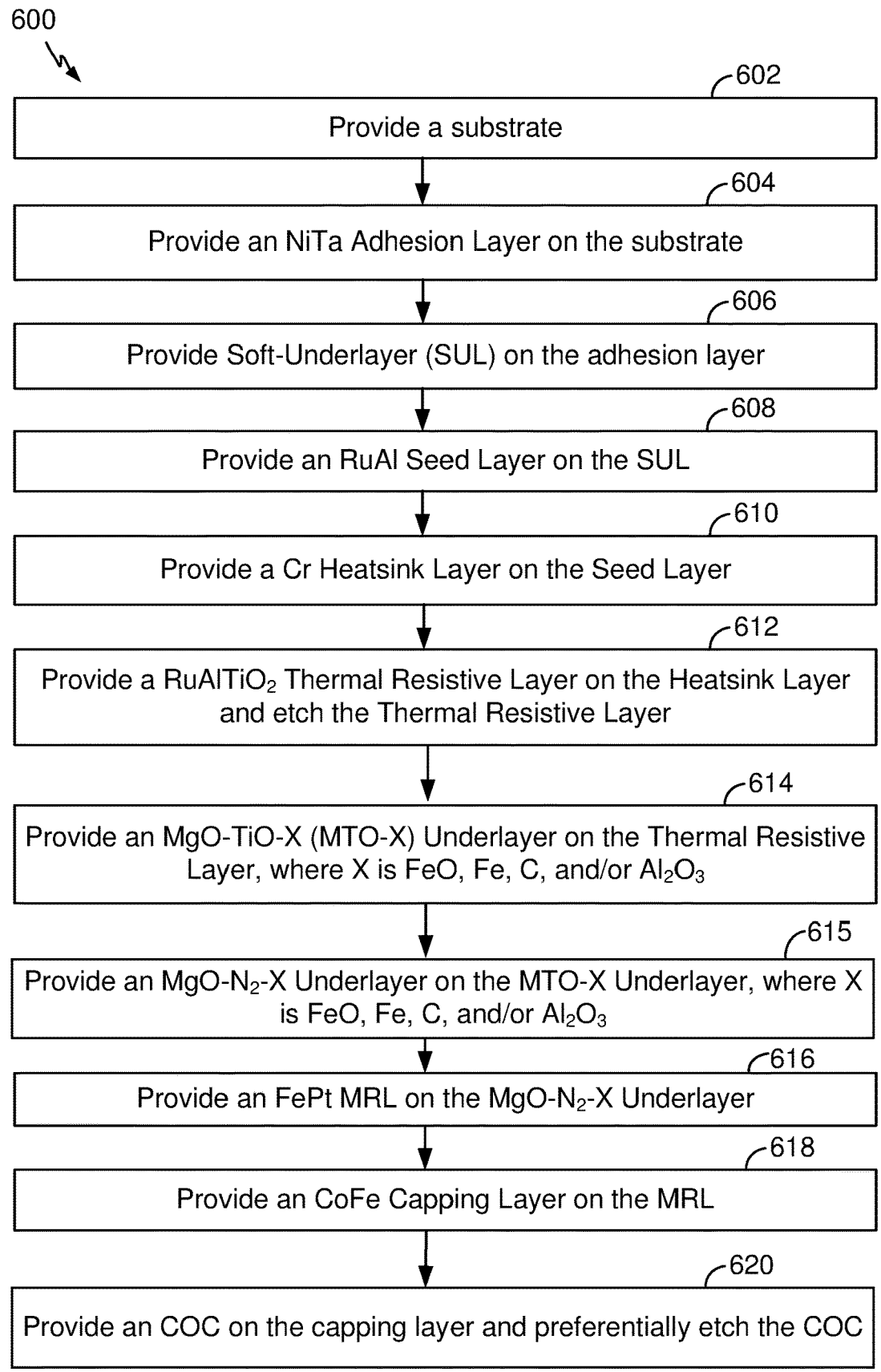
FIG. 6 is a flowchart of an exemplary process for fabricating a HAMR medium that includes an MTO underlayer and an MgO underlayer that both have the additive material that chemically bonds with titanium, in accordance with some aspects of the disclosure.

FIG. 6 is a flowchart of a process 600 for fabricating a HAMR medium with an MTO—X layer and an MGO-$N_2$—X layer in accordance with some aspects of the disclosure. In one aspect, the process 600 can be used to fabricate the HAMR media described above in relation to FIG. 5. In block 602, the process provides a substrate. In block 604, the process provides an adhesion layer (which may be formed, e.g., of NiTa) on the substrate. In block 606, the process provides an SUL on the adhesion layer. In block 608, the process provides a seed layer (which may be formed, e.g., of RuAl) on the SUL. In block 610, the process provides a heatsink layer (which may be formed, e.g., of Cr) on the seed layer. In block 612, the process provides a thermal resistive layer (which may be formed, e.g., of $RuAlTiO_2$) and then etches the thermal resistive layer. In block 614, the process provides an MgO—TiO—X (MTO-X) underlayer (where X is an additive material that chemically bonds with titanium, such as FeO, Fe, C, and/or $Al_2O_3$) on the thermal resistive layer. In block 615, the process provides an MgO—$N_2$—X underlayer (where X is an additive material that chemically bonds with titanium, such as FeO, Fe, C, and/or $Al_2O_3$) on the MTO—X layer. In block 616, the process provides an MRL (which may be formed, e.g., of FePt) on the MTO-X underlayer. In block 618, the process provides a capping layer 318 (which may be formed, e.g., of CoFe) on the MRL. In block 620, the process provides a COC on the capping layer and then preferentially etches the COC. Although not shown, the process may also provide a lubricant layer on the COC. Additional or alternative exemplary materials are listed above.

In the next example (FIGS. 7. and 8), an additional MgO—$N_2$ layer is provided but the additional MgO—$N_2$ layer does not include the additive material. Nevertheless, the additional MgO—$N_2$ layer still helps provide a barrier to titanium diffusion and hence can further mitigate that diffusion, at least as compared to the embodiments of FIGS. 3 and 4.

Figure 7:
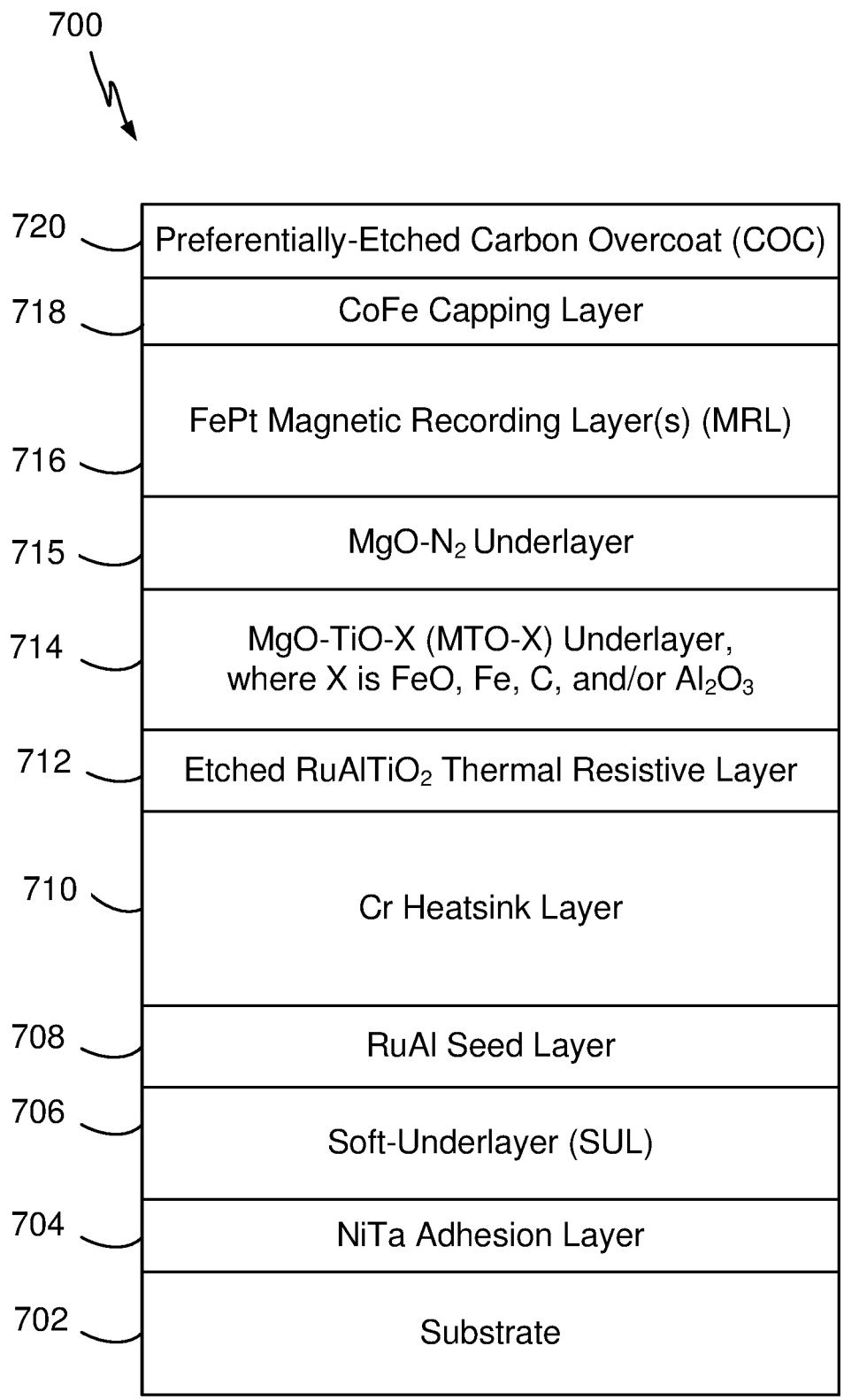
FIG. 7 is a side schematic view of an exemplary HAMR medium that includes, among other layers, an MTO underlayer and an MgO underlayer, where the MTO layer includes the additive material that chemically bonds with titanium, but the MGO layer does not include the additive material, in accordance with an aspect of the disclosure.

FIG. 7 is a side schematic view of an exemplary HAMR medium 700 in accordance with yet an aspect of the disclosure that includes an additional underlayer between the MTO layer and the MRL. In this example, the additional underlayer is an MgO—$N_2$ layer that does not include the additive material. As with the HAMR media of FIGS. 3 and 4, the HAMR medium 700 of FIG. 7 has a stacked structure with a substrate 702 at a bottom/base layer, an adhesion layer 704 on the substrate 702, an SUL 706 on the adhesion layer 704, a seed layer 708 on the SUL 706, a heatsink layer 710 on the seed layer 708, an etched thermal resistive layer 712, and an MgO—TiO—X (MTO-X) underlayer 714 (where X is an additive material that chemically bonds with titanium, such as FeO, Fe, C, and/or $Al_2O_3$) on the thermal resistive layer 712. In some examples, the MTO underlayer 714 is: (100−a)[(100−b)MgO-bTiO]-aX, where a is in the range of 0.1 to 10 mol %, inclusive, and b is in the range of 40 to 100 mol %, inclusive. Additionally, an MgO—$N_2$ underlayer 715 is provided on the MGO—X layer 715. An MRL 716 is on the MTO underlayer 714, a capping layer 718 is on the MRL 716, and a preferentially etched COC 720 is on the capping layer 718. Although not shown, an additional lubricant layer may be on the COC layer 720. The layers are not shown to scale. See, above, for further information regarding exemplary compounds that may be used in the various layers.

Figure 8:
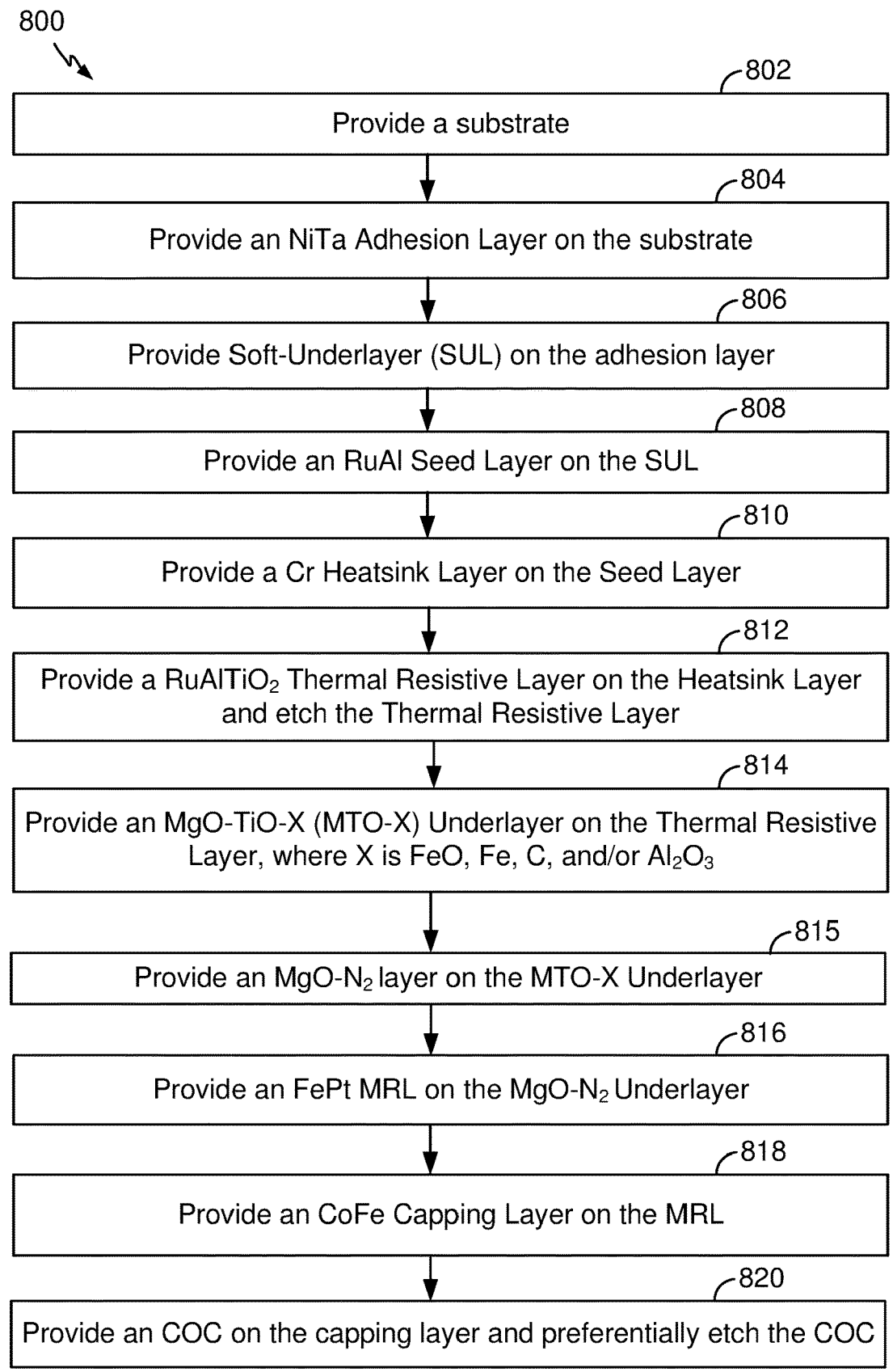
FIG. 8 is a flowchart of an exemplary process for fabricating a HAMR medium that includes the MTO underlayer and the MgO underlayer, where the MTO layer includes the additive material that chemically bonds with titanium, but the MGO layer does not include the additive material, in accordance with an aspect of the disclosure.

FIG. 8 is a flowchart of a process 800 for fabricating a HAMR medium with an MTO—X layer and an MGO-$N_2$ layer in accordance with some aspects of the disclosure. In one aspect, the process 800 can be used to fabricate the HAMR media described above in relation to FIG. 5. In block 802, the process provides a substrate. In block 804, the process provides an adhesion layer (which may be formed, e.g., of NiTa) on the substrate. In block 806, the process provides an SUL on the adhesion layer. In block 808, the process provides a seed layer (which may be formed, e.g., of RuAl) on the SUL. In block 810, the process provides a heatsink layer (which may be formed, e.g., of Cr) on the seed layer. In block 812, the process provides a thermal resistive layer (which may be formed, e.g., of $RuAlTiO_2$) and then etches the thermal resistive layer. In block 814, the process provides an MgO—TiO—X (MTO-X) underlayer (where X is an additive material that chemically bonds with titanium, such as FeO, Fe, C, and/or $Al_2O_3$) on the thermal resistive layer. In block 815, the process provides an MgO—$N_2$ layer on the MTO—X layer. In block 816, the process provides an MRL (which may be formed, e.g., of FePt) on the MgO—$N_2$ layer. In block 818, the process provides a capping layer 318 (which may be formed, e.g., of CoFe) on the MRL. In block 820, the process provides a COC on the capping layer and then preferentially etches the COC. Although not shown, the process may also provide a lubricant layer on the COC. Additional or alternative exemplary materials are listed above.

Insofar as the processes described herein are concerned, the processes can in some cases perform the sequence of actions in a different order. In another aspect, the process can skip one or more of the actions. In other aspects, one or more of the actions are performed simultaneously. In some aspects, additional actions can be performed. The deposition of at least some of the layers can be performed using any of a variety of deposition processes or sub-processes, including, but not limited to physical vapor deposition (PVD), sputter deposition and ion beam deposition, plasma enhanced chemical vapor deposition (PECVD) and other forms of chemical vapor deposition (CVD) besides PECVD, low pressure chemical vapor deposition (LPCVD) and atomic layer chemical vapor deposition (ALCVD). In other aspects, other suitable deposition techniques known in the art might also be used.

Additional Examples and Embodiments

Figure 9:
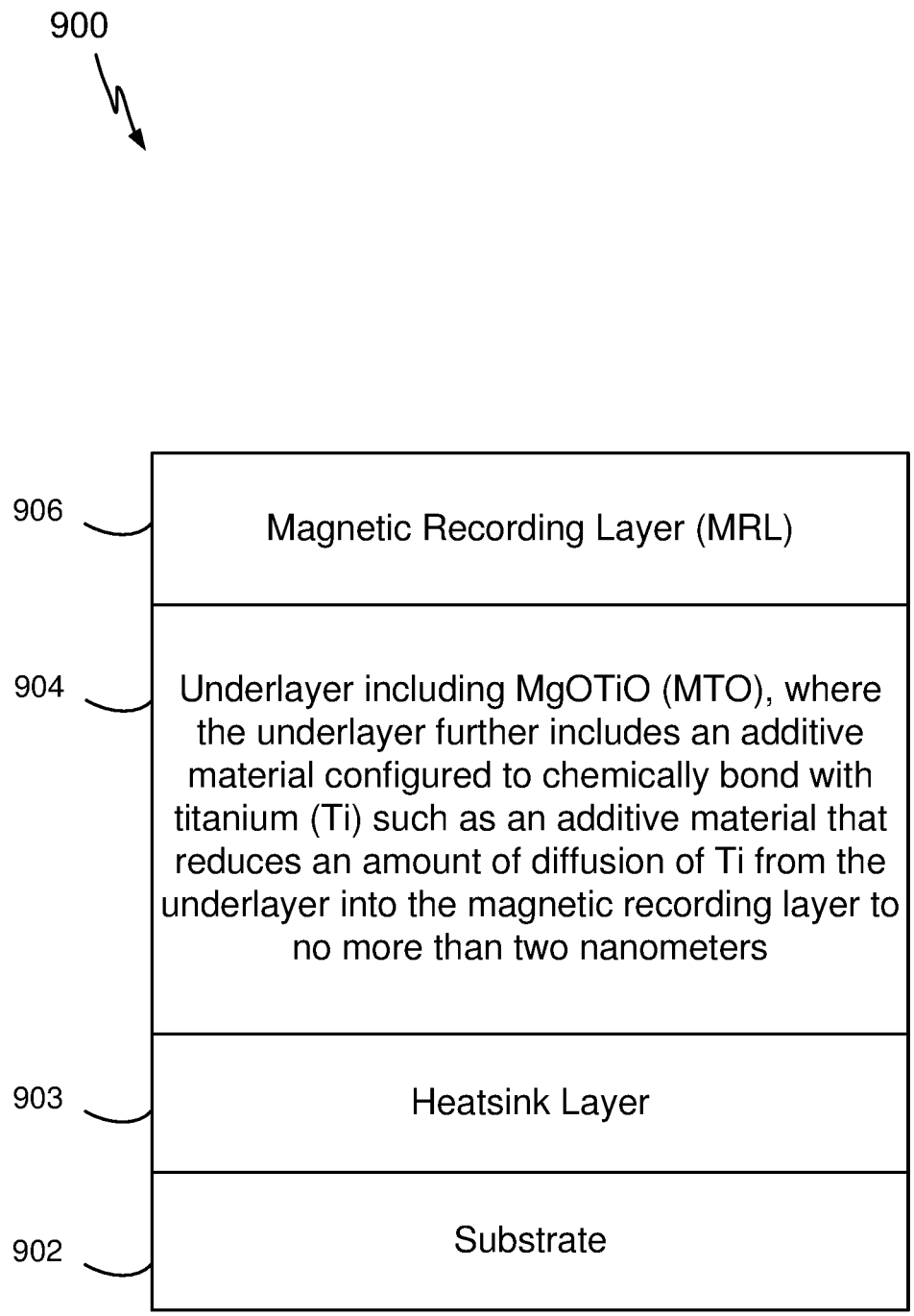
FIG. 9 is a side schematic view of an exemplary magnetic recording medium that includes an underlayer that includes MTO and an additive material that chemically bonds with titanium, in accordance with an aspect of the disclosure.

FIG. 9 is a side schematic view of an exemplary HAMR medium 900 in accordance with another aspect of the disclosure. The HAMR medium 900 has a stacked structure with a substrate 902, a heatsink layer 903 on the substrate, an underlayer 904 including MTO on the heatsink layer 903, wherein the underlayer further includes an additive material configured to chemically bond with titanium, and an MRL 906 on the underlayer 904. In some aspects, the additive material is a material that reduces an amount of diffusion of titanium from the underlayer into the magnetic recording layer to no more than two nm. In some aspects, the substrate 902 may be made of one or more materials such as an Al alloy, NiP-plated Al, glass, glass ceramic, and/or combinations thereof. In some aspects, the underlayer 904 may be an MgO—TiO—X (MTO-X) underlayer (where X is the additive material that chemically bonds with titanium, such as FeO, Fe, C, and/or $Al_2O_3$). In some aspects, the underlayer 904 layer is: (100−a)[(100−b)MgO-bTiO]-aX, where X is the additive material, a is in the range of 0.1 to 10 mol %, inclusive, and b is in the range of 40 to 100 mol %, inclusive. In some aspects the heatsink layer 903 may include Cr. In some aspects, the MRL 906 may be made of FePt. In some aspects, the MRL 906 may be made instead of an alloy selected from FePtY, where Y is a material selected from Cu, Ni, and combinations thereof. In other aspects, the MRL 906 may be made instead of a CoPt alloy. In some aspects, the MRL 906 may be formed of high anisotropy $L1_0$ FePt with segregants. In some examples, the MRL 906 may include one or more magnetic recording layers, which are not explicitly shown in FIG. 9. Additional layers of the HAMR media may be provided, as discussed above, such as an SUL, a capping layer, and an adhesion layer.

Figure 10:
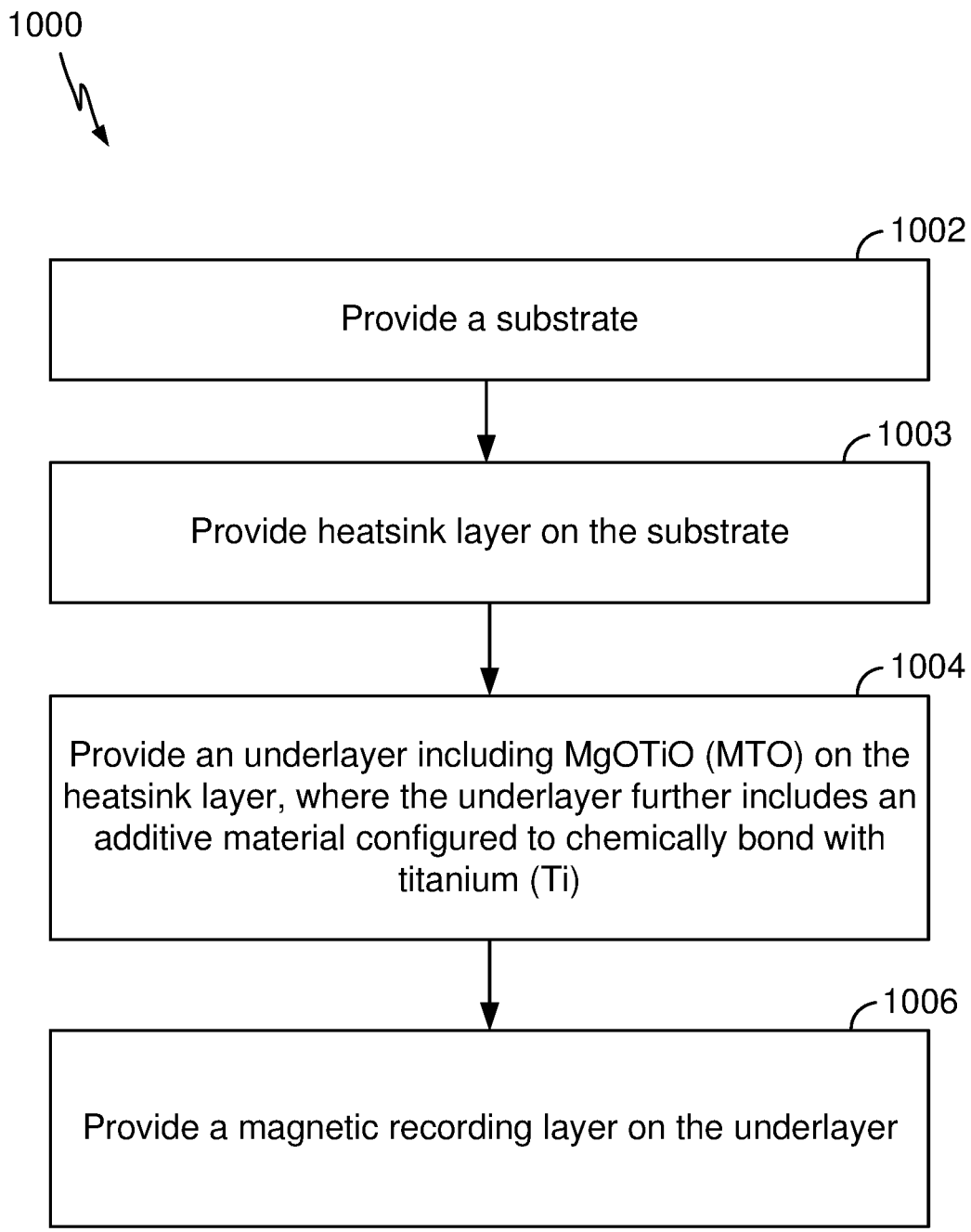
FIG. 10 is a flowchart of an exemplary process for fabricating a magnetic recording medium that includes an underlayer with MTO and an additive material that chemically bonds with titanium, in accordance with an aspect of the disclosure.

FIG. 10 is a flowchart of a process 1000 for fabricating a HAMR medium in accordance with some aspects of the disclosure. In one aspect, the process 1000 can be used to fabricate the HAMR media described above in relation to FIG. 9. In block 1002, the process provides a substrate. In block 1003, the process provides a heatsink layer on the substrate. In block 1004, the process provides an underlayer on the heatsink layer, wherein the underlayer further includes an additive material configured to chemically bond with titanium. In block 1006, the process provides an MRL on the underlayer, e.g., by depositing the MRL on the underlayer. In some aspects, the substrate may be made of one or more materials such as an Al alloy, NiP-plated Al, glass, glass ceramic, and/or combinations thereof. In some aspects, the heatsink layer may be made of Cr. In some aspects, the underlayer may be an MgO—TiO—X (MTO-X) underlayer (where X is the additive material that chemically bonds with titanium, such as FeO, Fe, C, and/or $Al_2O_3$). In some aspects, the underlayer is: (100−a)[(100−b)MgO-bTiO]-aX, where X is the additive material, a is in the range of 0.1 to 10 mol %, inclusive, and b is in the range of 40 to 100 mol %, inclusive. In some aspects, the MRL may be made of FePt. In some aspects, the MRL may be made instead of an alloy selected from FePtY, where Y is a material selected from Cu, Ni, and combinations thereof. In other aspects, the MRL may be made instead of a CoPt alloy. In some aspects, the MRL may be formed of high anisotropy $L1_0$ FePt with segregants. In some examples, the MRL may include one or more magnetic recording layers, which are not explicitly shown in FIG. 10. Additional layers of the HAMR media may be provided, as discussed above, such as an SUL, a capping layer, and an adhesion layer.

Additional Aspects

The examples set forth herein are provided to illustrate certain concepts of the disclosure. The apparatuses, devices, or components illustrated above may be configured to perform one or more of the methods, features, or steps described herein. Those of ordinary skill in the art will comprehend that these are merely illustrative in nature, and other examples may fall within the scope of the disclosure and the appended claims. Based on the teachings herein those skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

Aspects of the present disclosure have been described above with reference to schematic flowchart diagrams and/or schematic block diagrams of methods, apparatuses, systems, and computer program products according to aspects of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

The subject matter described herein may be implemented in hardware, software, firmware, or any combination thereof. As such, the terms "function," "module," and the like as used herein may refer to hardware, which may also include software and/or firmware components, for implementing the feature being described. In one example implementation, the subject matter described herein may be implemented using a computer readable medium having stored thereon computer executable instructions that when executed by a computer (e.g., a processor) control the computer to perform the functionality described herein. Examples of computer-readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding aspects. For instance, an arrow may indicate a waiting or monitoring period of unspecified duration between enumerated steps of the depicted aspect.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example aspects. The example systems and components described herein may be configured differently than described. For example, elements may be added to, removed from, or rearranged compared to the disclosed example aspects.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage or mode of operation.

While the above descriptions contain many specific aspects of the invention, these should not be construed as limitations on the scope of the invention, but rather as examples of specific aspects thereof. Accordingly, the scope of the invention should be determined not by the aspects illustrated, but by the appended claims and their equivalents. Moreover, reference throughout this specification to "one aspect," "an aspect," or similar language means that a particular feature, structure, or characteristic described in connection with the aspect is included in at least one aspect of the present disclosure. Thus, appearances of the phrases "in one aspect," "in an aspect," and similar language throughout this specification may, but do not necessarily, all refer to the same aspect, but mean "one or more but not all aspects" unless expressly specified otherwise.

The terminology used herein is for the purpose of describing particular embodiments only and is not intended to be limiting of the embodiments. As used herein, the singular forms "a," "an" and "the" are intended to include the plural forms as well (i.e., one or more), unless the context clearly indicates otherwise. An enumerated listing of items does not imply that any or all of the items are mutually exclusive and/or mutually inclusive, unless expressly specified otherwise. It will be further understood that the terms "comprises," "comprising," "includes" "including," "having," and variations thereof when used herein mean "including but not limited to" unless expressly specified otherwise. That is, these terms may specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be used there or that the first element must precede the second element in some manner. Also, unless stated otherwise a set of elements may include one or more elements. In addition, terminology of the form "at least one of a, b, or c" or "a, b, c, or any combination thereof" used in the description or the claims means "a or b or c or any combination of these elements." For example, this terminology may include a, or b, or c, or a and b, or a and c, or a and b and c, or 2a, or 2b, or 2c, or 2a and b, and so on.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

What is claimed is:

1. A magnetic recording medium comprising:
   a substrate;
   a heatsink layer on the substrate;
   an underlayer comprising MgOTiO (MTO) on the heatsink layer, wherein the underlayer further includes an additive material configured to chemically bond with titanium, the additive material comprising at least one of FeO, Fe, C, or $Al_2O_3$; and
   a magnetic recording layer on the underlayer.

2. The magnetic recording medium of claim 1, wherein the underlayer comprises:

(100−a)[(100−b)MgO-bTiO]-aX, wherein X is the additive material,
   wherein a is in the range of 0.1 to 10 mol %, inclusive, and
   wherein b is in the range of 40 to 100 mol %, inclusive.

3. The magnetic recording medium of claim 1, further comprising an MgO—$N_2$ layer between the underlayer and the magnetic recording layer.

4. The magnetic recording medium of claim 3, wherein the MgO—$N_2$ layer further comprises at least one of FeO, Fe, C, or $Al_2O_3$.

5. The magnetic recording medium of claim 1, further comprising an adhesion layer, a soft underlayer (SUL), and a seed layer, in that order, between the substrate and the heatsink layer, and a thermal resistive layer between the heatsink layer and the underlayer.

6. The magnetic recording medium of claim 5, wherein the adhesion layer comprises NiTa, the seed layer comprises RuAl, the heatsink layer comprises Cr, and the thermal resistive layer comprises $RuAlTiO_2$.

7. The magnetic recording medium of claim 1, further comprising a capping layer on the magnetic recording layer and a carbon overcoat (COC) on the capping layer.

8. The magnetic recording medium of claim 1, wherein the magnetic recording layer comprises FePt.

9. The magnetic recording medium of claim 1, wherein the additive material comprises FeO that amounts to 5% (mol %) of the underlayer.

10. The magnetic recording medium of claim 1, where the magnetic recording medium is configured for heat-assisted magnetic recording (HAMR).

11. A data storage device comprising:
    a slider comprising a magnetic head; and
    the HAMR medium of claim 10,
    wherein the slider is configured to write information to the magnetic recording layer of the HAMR medium.

12. A method for manufacturing a recording medium, the method comprising:
    providing a substrate;
    providing a heatsink layer on the substrate;
    providing an underlayer comprising MgOTiO (MTO) on the heatsink layer, wherein the underlayer further includes an additive material configured to chemically bond with titanium and wherein the additive material comprises at least one of FeO, Fe, C, or $Al_2O_3$; and
    providing a magnetic recording layer on the underlayer.

13. The method of claim 12, wherein the underlayer comprises:

(100−a)[(100−b)MgO-bTiO]-aX, wherein X is the additive material,
    wherein a is in the range of 0.1 to 10 mol %, inclusive, and
    wherein b is in the range of 40 to 100 mol %, inclusive.

14. The method of claim 12, further comprising providing an MgO—$N_2$ layer between the underlayer and the magnetic recording layer.

15. The method of claim 14, wherein the MgO—$N_2$ layer further comprises at least one of FeO, Fe, C, or $Al_2O_3$.

16. The method of claim 12, further comprising providing an adhesion layer, a soft underlayer (SUL), and a seed layer, in that order, between the substrate and the heatsink layer, and providing a thermal resistive layer between the heatsink layer and the underlayer.

17. The method of claim 12, wherein the magnetic recording layer is configured for heat-assisted magnetic recording (HAMR).

18. A magnetic recording medium comprising:
    a substrate;
    a heatsink layer on the substrate;
    an underlayer comprising MgOTiO (MTO) on the heatsink layer, wherein the underlayer further includes an additive material configured to chemically bond with titanium;
    an MgO—$N_2$ layer on the underlayer; and
    a magnetic recording layer on the MgO—$N_2$ layer.

19. The magnetic recording medium of claim 18, wherein the additive material comprises at least one of FeO, Fe, C, or $Al_2O_3$.

20. The magnetic recording medium of claim 18, wherein the underlayer comprises:

(100−a)[(100−b)MgO-bTiO]-aX, wherein X is the additive material,
    wherein a is in the range of 0.1 to 10 mol %, inclusive, and
    wherein b is in the range of 40 to 100 mol %, inclusive.

21. The magnetic recording medium of claim 18, wherein the MgO—$N_2$ layer further comprises at least one of FeO, Fe, C, or $Al_2O_3$.

22. The magnetic recording medium of claim 18, further comprising an adhesion layer, a soft underlayer (SUL), and a seed layer, in that order, between the substrate and the heatsink layer, and a thermal resistive layer between the heatsink layer and the underlayer.

23. The magnetic recording medium of claim 22, wherein the adhesion layer comprises NiTa, the seed layer comprises RuAl, the heatsink layer comprises Cr, and the thermal resistive layer comprises $RuAlTiO_2$.

24. The magnetic recording medium of claim 18, wherein the magnetic recording layer comprises FePt.

* * * * *